US012791720B2

(12) United States Patent
Berger et al.

(10) Patent No.: US 12,791,720 B2
(45) Date of Patent: Nov. 10, 2026

(54) LIGHT-BASED TIME-OF-FLIGHT SENSOR SIMULATION

(71) Applicant: GM Cruise Holdings LLC, San Francisco, CA (US)

(72) Inventors: Brett Berger, Sunnyvale, CA (US); Ryan Suess, Seattle, WA (US); Amin Aghaei, Fremont, CA (US); Stephanie Hsu, San Mateo, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 1053 days.

(21) Appl. No.: 17/972,382

(22) Filed: Oct. 24, 2022

(65) Prior Publication Data

US 2024/0134052 A1 Apr. 25, 2024
US 2024/0230909 A9 Jul. 11, 2024

(51) Int. Cl.
*G01S 17/894* (2020.01)
*G01S 7/4865* (2020.01)
*G01S 17/04* (2020.01)

(52) U.S. Cl.
CPC .......... *G01S 17/894* (2020.01); *G01S 7/4865* (2013.01); *G01S 17/04* (2020.01)

(58) Field of Classification Search
None
See application file for complete search history.

(56) References Cited

PUBLICATIONS

Lindner, Marvin, et al. "Time-of-flight sensor calibration for accurate range sensing." Computer Vision and Image Understanding 114.12 (2010): 1318-1328 (Year: 2010).*
Grollius, Sara, et al. "Concept of an automotive LiDAR target simulator for direct time-of-flight LiDAR." IEEE Transactions on Intelligent Vehicles 8.1 (2021): 825-835 (Year: 2021).*
Fang, Jin, et al. "Simulating LIDAR point cloud for autonomous driving using real-world scenes and traffic flows." arXiv preprint arXiv:1811.07112 1 (2018) (Year: 2018).*

* cited by examiner

*Primary Examiner* — Luke D Ratcliffe
(74) *Attorney, Agent, or Firm* — CANTOR COLBURN LLP

(57) ABSTRACT

Systems and techniques of the present disclosure may access data from a time-of-flight (TOF) sensor of an autonomous vehicle (AV). The TOF sensor may have light signals and received reflections of those transmitted signals such that a set of simulation data can be generated. This set of simulation data may identify a distance to associate with an object that is different from a calibration distance. Equations may be used to identify a light signal amplitude, a signal to noise ratio (SNR), and a range inaccuracy due to noise from the accessed data. The identified the light signal amplitude, the SNR, and the range inaccuracy due to noise may have been identified using equations. Once the set of simulation data is generated, it may be saved for later access by a processor executing a simulation program used to train devices used to control the driving of an AV.

18 Claims, 5 Drawing Sheets

LIGHT-BASED TIME-OF-FLIGHT SENSOR SIMULATION

TECHNICAL FIELD

The present disclosure generally provides solutions for improving sensor function and more particularly, for improving the operation of time-of-flight sensors used on autonomous vehicles (AVs) by simulating their operation in a virtual environment.

BACKGROUND

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at specific locations on the autonomous vehicles.

BRIEF DESCRIPTION OF THE DRAWINGS

Illustrative examples of the present application are described in detail below with reference to the following figures.

DETAILED DESCRIPTION

Figure 1:
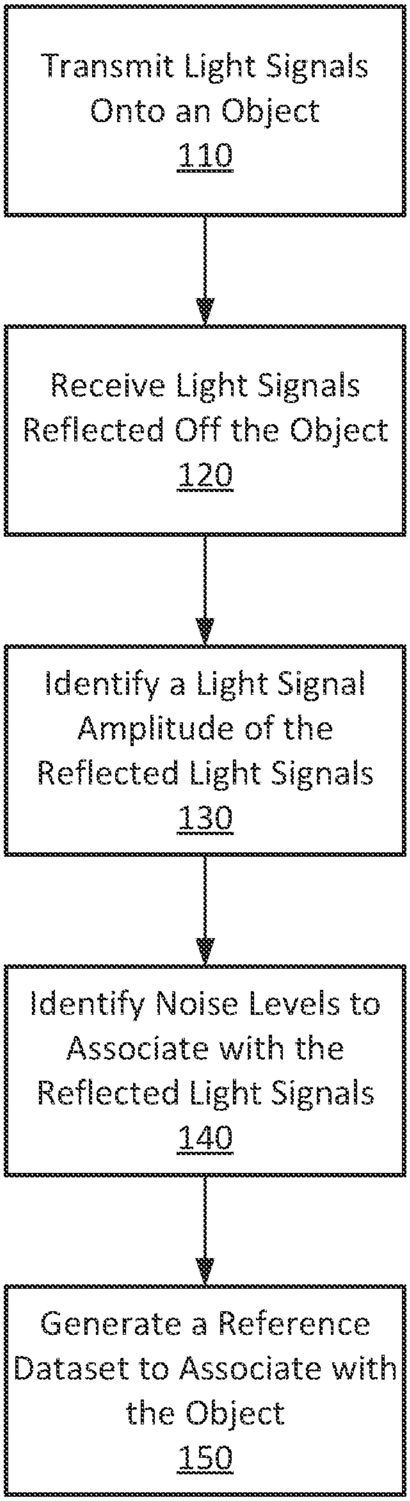
FIG. 1 illustrates a process for collecting sets of data from a light-based sensor, according to some examples of the present disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of implementations of the application. However, it will be apparent that various may be practiced without these specific details. The figures and description are not intended to be restrictive.

The ensuing description provides examples only, and is not intended to limit the scope, applicability, or configuration of the disclosure. Rather, the ensuing description of the examples will provide those skilled in the art with an enabling description for implementing exemplary methods and apparatus. It should be understood that various changes may be made in the function and arrangement of elements without departing from the scope of the application as set forth in the appended claims.

One aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Described herein are systems, apparatuses, processes (also referred to as methods), and computer-readable media (collectively referred to as "systems and techniques") for using new sensors in an autonomous vehicle driving system (e.g., a computer of an autonomous vehicle or autonomous driving system computer (ADSC)). The systems and techniques described herein may include placing an object at a calibration distance proximal to a light emitting and sensing device. The calibration distance can include any distance. In an illustrative example, the calibration distance be a distance of several to tens of meters. In other examples, the calibration distance can be greater or smaller than several to tens of meters. The light emitting and sensing device may transmit light signals towards the object and receive reflections of the light signals. The reflections of the light signals can be caused or generated by (and/or a result of) the transmitted light signals bouncing/reflecting off of the object. The object may have a known reflectance which can help a system evaluate properties of light signals reflected off of an object. Measurements may be made to identify an amplitude of the reflected light signal and an amount of noise associated with the reflected light signal. The calibration distance to the object may be set at a calibration distance such as 10 meters (m), for example, or any other distance. The calibration distance may be one of several factors of a calibration environment that may include, for example, a background luminosity, a target reflectance (e.g., a reflectance of the object), and/or a transmitted frequency or transmitted modulation frequency.

For example, and without limitation, in some cases, the factors (e.g., calibration distance, target reflectance, and/or transmitted frequency or transmitted modulation frequency) may include a calibration distance of 10 meters, a 10% object reflectance, and a transmitted signal of 24 million Hertz (MHz). In other cases, the factors may include a different calibration distance, target reflectance, and/or transmitted frequency or transmitted modulation frequency. Another factor that may be associated with a set of calibration data is an integration time. This integration time may be an amount of time that it takes to convert several individual samples of reflected light data into a set of frame data. In some cases, an example integration time may be 2.5 milliseconds. In other cases, the integration time can be more or less than 2.5 milliseconds.

The light emitting and sensing device may vary its own integration time and modulation frequency across several frames in a set of frame data to obtain a high dynamic range (HDR) signal. For example, the light emitting and sensing device may obtain signals with different integration times or exposures, and merge/fuse the signals with the different integration times or exposures into a single signal. Such a merged signal may be referred to as a HDR signal that has a greater range of values than signals that were obtained with a single integration time or exposure.

For example, a photograph of a dim object captured using a first exposure time may appear to be less clear than a photograph of the same dim object captured using a second exposure time that is longer than the first exposure time. When the same photograph includes a bright object, the image of that bright object using the first exposure time may be clearer than an image of that bright object acquired using the second exposure time. If two photographs that include both the dim object and the bright object were captured respectively using the first exposure time and the second exposure time, a combined image can be generated based on both images. In this example, the combined image can include a clearer view (e.g., clearer than either the image with the first exposure time or the image with the second exposure time) of the dim object and a clearer view (e.g., clearer than either the image with the first exposure time or the image with the second exposure time) of the bright object. Put another way, increasing the exposure time when capturing an image of a dim object allows more light reflected off the dim object to be captured, which allows for more details of that dim object to be captured/observed. In contrast, by increasing the exposure time when capturing an image of a bright object, an excessive amount of light may be collected, which can negatively impact the quality of the image. For example, the brightness resulting from the excessive amount of light may wash out or blur details of the bright object. In other words, the resulting image can be overexposed.

Longer exposure times, therefore, allow a greater range of values to be assigned to images taken of a dim object, and shorter exposure times allow a greater range of values to be assigned to images taken of the bright object. Because of this, a combined image will have a greater range of values (a greater dynamic range or higher dynamic range) than either an image taken with the first exposure time or the second exposure time. The same is true for data obtained by light emitting and sensing devices that acquire data using different integration times or exposures. As such, a light emitting, and sensing device may generate an HDR signal that has a greater range of values than signals that were obtained with a single integration time or exposure.

The information associated with the object and the received light signals may be included in a set of calibration data. A computer system of an autonomous vehicle (e.g., an autonomous driving system computer (ADSC) or autonomous vehicle driving system) can use data from the light emitting and sensing device to generate a set of simulation data that the computer system can use to create and run simulations of an autonomous vehicle (AV). The set of simulation data may be generated dynamically, meaning that it can be created to correspond to an input scene in the simulation. In some examples, the set of simulation data may include estimated values of a reflected light signal amplitude, an estimated signal to noise ratio, and/or an estimated measure of a range inaccuracy due to noise. The range inaccuracy can include, define, and/or represent a measure of uncertainty of a perceived location (e.g., a location perceived by the AV) of an object in an environment such as a virtual or physical/real environment. A real or actual range inaccuracy (or range precision) may be a function of a measure of noise, an amplitude of the reflected portion of the light signal, and a calibration distance that were measured when a time-of-flight sensor was calibrated. A virtual inaccuracy (or virtual precision) may relate to an uncertainty associated with a virtual object that is included in a set of simulation data. This virtual inaccuracy may be a function of a noise associated with an estimated light signal that reflects off the virtual object, an amplitude of the estimated light signal received by a sensor, and a distance to the virtual object in a set of simulation data. In some examples, the estimated light signal amplitude of a light signal may change according to an inverse square of a distance to an object. This means that when the distance to an object doubles, the estimated light signal amplitude will change by a value of one fourth.

In many cases, the aim of simulating a light emitting and sensing device is to generate and provide data as if the data came from the light emitting and sensing device in the real-world given a model of the device and a model of the world. The intended use case of the simulated light emitting and sensing device can include quickly generating depth information of objects in an environment of the light emitting and sensing device (e.g., surrounding objects). Some approaches can simulate the light emitting and sensing device based on a model and/or understanding of how the light emitting and sensing device behaves. The output from the simulated light emitting and sensing device can be structured as if the output was indeed generated by the real, physical light emitting and sensing device. In some cases, it can be very difficult to account for all the physics for how the light emitting and sensing device works. Even if all the physics of the light emitting and sensing device could be modeled, the latency in generating the sensor outputs would generally be too high and the various calculations may not be complete before the time for providing the calculations is up (e.g., before the calculations are needed).

One example alternative is to model a limited amount of the physics involved in the operation and/or calculations of the light emitting and sensing device. However, with such approaches, the modeled sensor and/or associated calculations may include a significant amount of gaps and/or may include a significant amount of errors and/or inaccuracies. By contrast, as further explained herein, the systems and techniques of the present disclosure can achieve a balance between achieving a certain accuracy in the modeled light emitting and sensing device and its associated calculations, and reducing the overall latency in modeling the light emitting and sensing device and obtaining the associated calculations. For example, the systems and techniques described herein can be used to accurately model the physics of the light emitting and sensing device while also reducing the overall latency of the simulation outputs (e.g., the simulation data/calculation results) from the simulated light emitting and sensing device. In other words, the systems and techniques described herein can obtain simulation outputs (e.g., simulation data/calculation results, etc.) quickly without exceeding a threshold latency, while also achieving a certain degree of accuracy (e.g., a threshold accuracy) in modeling the light emitting and sensing device and the simulation outputs (e.g., the simulation data) associated with the light emitting and sensing device. The simulated light emitting and sensing device can thus quickly produce accurate simulation data that can be used be used for training, as further explained herein.

In some examples, the sets of simulation data generated by the light emitting and sensing device may be used to train the autonomous driving system computer (ADSC) of an AV. In some cases, a set of simulation data can be used to train the ADSC of an AV without (or before) the ADSC is used to drive (and/or used to control one or more navigation, prediction, planning, driving, and/or other operations of) an AV in a roadway. Different sets of simulation data may depict and/or place an object at different locations and/or may use different motion vectors to describe a motion of the object. Values of an estimated light signal amplitude may be adjusted according to the inverse square law based on changes in the distance between the ADSC of an AV and the object for each respective set of simulation data. Updates to simulation data may include updates to one or more attributes, statistics, and/or metrics of an AV such as, for example and without limitation, updates to a pose of the AV, updates to a velocity of the AV, updates to a trajectory of the AV, etc. In one illustrative example, the updates to simulation data may include changes to the velocity of the AV. In such an instance, the simulation may help determine whether the ADSC can safely avoid the object when that object moves into the path of the AV as distances to the object and the AV velocity are changed. In an instance when the AV impacts the object (e.g., collides with the object) when a simulation is run, parameters of the ADSC may be updated, and the simulation may be run iteratively until the ADSC learns how best to avoid impacting the object.

An example of a benefit derived from performing techniques according to the present disclosure is that an ADSC of an AV can be trained more quickly than previously possible. This is achieved by leveraging relatively small amounts of real-world data to simulate the ADSC of the AV driving along roadways, Because of this, the ADSC of the AV may be trained without physically driving the AV down public roadways, reducing risks associated with driving an AV along a public roadway before the design of the ADSC is refined. Another benefit is that a new sensor or new type of sensor can be manufactured, operated, and deployed more rapidly and with higher confidence. Limitations of current approaches to train an ADSC of an AV require the collection of thousands to hundreds of thousands of hours of driving time, such an approach increases the risks associated with the ADSC driving the AV before the design of the AV is refined. Furthermore, systems and techniques consistent with the present disclosure may be refined more quickly than the current approach that requires the collection of thousands to hundreds of thousands of hours of driving time.

Sets of simulation data may be identified from limited amounts of real-world data in a controlled environment. For example, a newly developed sensor may be placed in a laboratory environment where data regarding the operation of the new sensor may be collected. This collected data may include levels of noise and amplitude values (signal values) of light that has been reflected off a real object in the controlled environment. From the real-world signal data and noise data, a signal to noise ratio (SNR) may be identified. Observed noise, signal levels, and SNR values may be used to identify values of noise, signal levels, and SNR to include in a simulation. These simulations may be used to test the operation of an ADSC using distances to objects that were not evaluated in the controlled environment. Values of noise, signal amplitude values, and SNR to include in a simulation may be estimated using equations, as such the ability of the ADSC to drive the AV may be improved without having to drive the AV along roadways.

Examples of the systems and techniques described herein are illustrated in FIG. 1 through FIG. 5 and described below.

FIG. 1 illustrates an example process for collecting sets of data from a light-based sensor, such as a time-of-flight (TOF) sensor. At block 110, the process includes transmitting a set of light signals into an environment that includes an object. The object can be located at a calibration distance from the light-based sensor. When the light signals reach the object, at least a portion of the energy from the signals may be reflected from the object. In some examples, the set of light signals can be transmitted after the object has been placed near (e.g., proximal to by at least a threshold distance or within a threshold distance) a location where the light-based sensor is located. The object may have a known or predetermined reflectance. As mentioned above, a calibration distance may have been set at a particular distance such as 10 meters (m), for example. In some aspects, the environment where the object is located may be a test environment such as a garage.

At block 120, the process can include receiving, by the light-based sensor, a portion of the transmitted light signals reflected from/off the object. At block 130, after the portion of the transmitted light signals reflected from/off the object (e.g., also referred to as the reflected light signals) are received, the process can include identifying an amplitude of the reflected light signals. The amplitude values of the reflected light signals (e.g., also referred to as the reflected light signal amplitude values or ATOF values) may be a function of a number of photons that impact a light-based sensor. In some cases, multiple acquisition cycles or frames (e.g., 2, 3, 4, etc.) of data may be used to identify the reflected light signal amplitude value (or amplitude-time-of-flight (ATOF) value). Each of these frames may be collected after the light-based sensor transmitted the set of light signals (e.g., the transmitted light signals). In some examples, each of these frames may be combined/fused to form an exposure that includes a total number of photoelectrons. The total number of photoelectrons can be used to identify the reflected light signal amplitude. A value of the reflected light signal amplitude may be referred to as an amplitude-time-of-flight (ATOF) value. In systems with a high dynamic range (HDR) mode, a single ATOF value may be associated with data from multiple acquisition cycles. Block 130 may include obtaining data from the TOF sensor that received the reflected portion of a light signal from an object. In some cases, the data comprises a plurality of metrics. The plurality of metrics may comprise at least one of a calibration distance, a calibrated reflectance, a measure of noise, and an amplitude of the reflected portion of the light signal/ATOF value.

At block 140, the process can include identifying noise levels of the reflected light signals and generating a reference dataset to associate with the object. This reference dataset may be referred to as a calibration dataset. In some examples, the reference dataset may be associated with one or more sets of known metrics or values. Such known metrics or values may include, for example, an amplitude of a transmitted light signal, the calibration distance associated with the object, a known luminosity or ambient light of the environment, a known reflectance of the object, a measured value of the reflected light signal (e.g., a measured ATOF), and/or measured values of noise associated with operation of the sensor. Block 140 may include determining, based on the data from the TOF sensor, a signal to noise ratio (SNR). An actual or real value of SNR may equal the measured ATOF value divided by the noise levels associated with the reflected light signals. These actual or real noise levels may be identified by measurements made at a real physical time-of-flight sensor when that sensor is calibrated or used.

At block 150, the process can include generating a reference dataset to associate with the object. This reference dataset may be provided as a set of input data to a process (and/or algorithm) that estimates levels of reflected signal amplitude and noise that may correspond to different potential distances between a location of the sensor and the object. This set of input data may also include other metrics that may be provided to a computer system (e.g., the ADSC) of an autonomous vehicle when the computer system runs simulations of the autonomous vehicle driving in a street and/or environment.

The process of FIG. 1 may be performed in a controlled test environment that may be, for example, a garage. Different reference datasets may be generated when conditions of the test environment are modified. This may include generating fog and providing that fog to the environment or using sprinklers to simulate rain. This would allow sets of data acquired to be acquired using an actual TOF sensor such that those datasets can be included in respective sets of simulation data.

Figure 2:
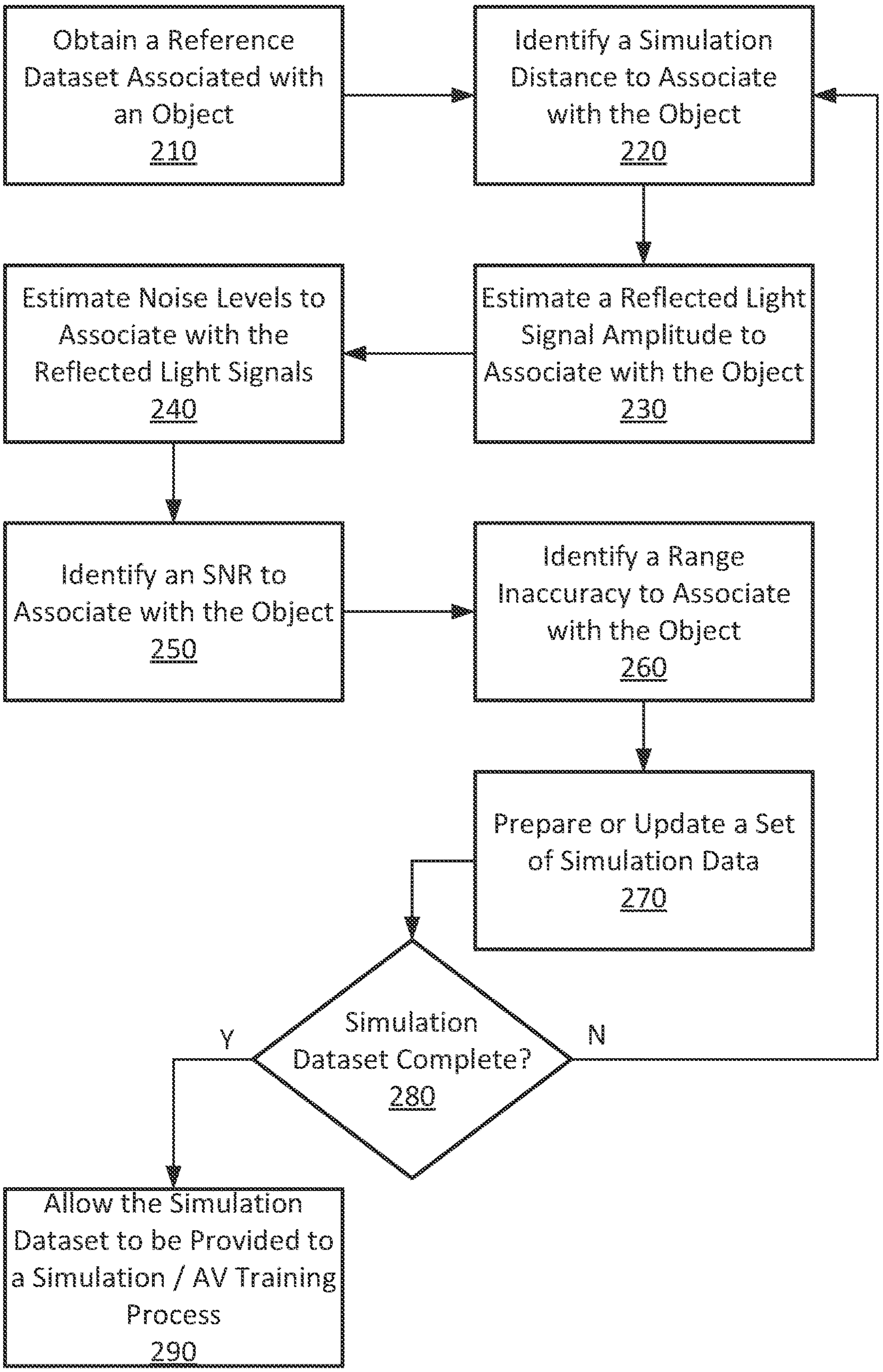
FIG. 2 illustrates a process for using a simulation dataset, according to some examples of the present disclosure.

FIG. 2 illustrates an example process for using a simulation dataset. At block 210, the process can include accessing a reference dataset. In some cases, the reference dataset accessed at block 210 may be the same reference dataset that was generated at block 150 of FIG. 1. At block 220, the process can include associating a simulation distance with an object (e.g., the object associated with the reference dataset and described above with respect to FIG. 1). For example, the process can place the object at a distance from a location where a sensor resides. The distance between the sensor and the object's location may be considered as the simulation distance. In certain instances, this simulation distance may be the same as the calibration distance discussed with respect to FIG. 1. In other instances, the simulation distance may be any distance that is within a range of the sensor. Furthermore, this simulation distance may be specified in the reference dataset. At block 220, the process can include identifying an angle to associate with a location of the object in a simulated environment. Such an angle may be an azimuth and/or an elevation associated with an object or a set of transmitted signals that may correspond to the simulation distance.

At block 230, the process can include estimating an ATOF value (e.g., an estimated reflected light signal amplitude). One example way that the estimated ATOF may be provided to a simulation program is via a lookup table. Such a lookup table may be stored at a local cache memory of a processor such that data included in that lookup table can be accessed very rapidly by the processor such that simulations can be performed in near-real-time. In this example, the lookup table may store estimated light signal amplitudes for different regions of the sensing field of view, at a fixed target distance(s) and reflectance(s). The estimated reflected light signal amplitude may be identified by determining a change in distance, reflectance, integration time, and/or modulation frequency of the reflected light signals with the ATOF. The formula connecting the values from the lookup table to the estimated values generated in the simulation may depend on device characteristics such as the frequency $F_{lpf}$ beyond which the sensor behaves as a low pass filter. The formula may also depend on ratios of calibrated and simulated object reflectance, distances, and/or integration times. In some cases, a formula such as Equation 1 below may be used. This simulated object reflectance may be associated with a virtual object used in a set of simulation data.

Computing ATOF for simulated data, from reference data

Equation 1

$$ATOF = ATOF_{ref}\left(\frac{\text{Distance}_{ref}}{\text{Distance}}\right)^2\left(\frac{\text{Integration time}}{\text{Integration time}_{ref}}\right)\left(\frac{\text{Reflectance}}{\text{Reflectance}_{ref}}\right)\sqrt{\frac{1+(\text{Modulation Frequency}_{ref}/F_{lpf})^2}{1+(\text{Modulation Frequency}/F_{lpf})^2}}$$

The simulation may additionally select one of several computed ATOF values in order to best fit the HDR settings of the light-based sensor or sensing apparatus. The ATOF value calculated using Equation 1 is a function of an ATOF reference value ($ATOF_{ref}$), a distance reference value ($Distance_{ref}$), a reference integration time value (Integration $time_{ref}$), a reflectance reference value ($Reflectance_{ref}$), and a reference modulation frequency (Modulation $Frequency_{ref}$). In some examples, these reference values (e.g., the $ATOF_{ref}$, the $Distance_{ref}$, the Integration $time_{ref}$, the $Reflectance_{ref}$, and the Modulation $Frequency_{ref}$) may include values used when a time-of-flight light-based sensor was calibrated in laboratory conditions (e.g., in a garage or other laboratory). In some examples, the reference distance (e.g., $Distance_{ref}$) can include or represent a calibration distance, which refers to a distance between a real physical sensor and a real object that is measured by the real physical sensor based on light signals reflected from the real object. The reference integration time (e.g., Integration $time_{ref}$) may be an exposure time, which can refer to the length of time that the sensor collects light from a sample. In other words, the reference integration time can include a time used to integrate received light signal information. The reference reflectance value may be a reflectance associated with the object targeted by (e.g., the object at which the light-based sensor directs light) the light-based sensor at the calibration distance in the laboratory conditions. The reference ATOF value may be an actual amplitude value of light reflected from the object and measured by an actual time-of-flight light-based sensor (e.g., by a real, physical time-of-flight sensor). The reference modulation frequency may be a frequency of light used to capture the reference ATOF value.

The value of ATOF derived from Equation 1 can be a function of a distance, an integration time, a reflectance, and a modulation frequency used in a simulation. Values associated with the distance, integration time, reflectance, and modulation time used in a simulation may be the same as or different from the reference values discussed above (e.g., the $ATOF_{ref}$, the $Distance_{ref}$, the Integration $time_{ref}$, the $Reflectance_{ref}$, and the Modulation $Frequency_{ref}$). A given simulation may move an object closer or farther away from a sensor, increase or decrease an integration time, modify the reflectance based on one or more environmental factors (e.g., simulated fog, simulated atmospheric conditions such as precipitation, etc.), and/or change a light (e.g., modulation) frequency used in the simulation. Another factor used in Equation 1 may be a frequency associated with a low pass filter ($F_{lpf}$). The low pass filter frequency may be a cutoff frequency of a filter used to filter light signals. Such a cutoff frequency may correspond to a frequency where a low pass filter reduces input signal power by a certain amount, such as one half or minus three decibels (−3 db), for example.

At block 240, the process can include estimating noise levels to associate with the ATOF value identified at block 230, this ATOF value may be associated with a signal-to-noise ratio (SNR) for the estimated reflected signal amplitude at block 250. A range inaccuracy due to noise may also be identified at block 260. Such a range of inaccuracy may be an uncertainty induced by noise. This is because noise may result in small errors in determining an object's precise location and a magnitude of these errors may be a function of this noise. In some examples, an estimated SNR may be identified using Equation 2 (e.g., the estimated SNR ratio formula) below. This estimated SNR may be a value of SNR used when a simulation is run (e.g., a simulated SNR). As previously explained, the estimated SNR value can be used to determine a range inaccuracy or uncertainty due to noise.

A value for the amount of noise in the system can be determined by an analytic model, by using experimental data, or by some combination thereof using a coefficient C with units that produce a dimensionless SNR value. The coefficient C may be a value of proper dimension that can be tuned to empirically match observed noise. This range inaccuracy may correspond to an estimated amount of noise.

Signal to Noise Ratio Formula Equation 2

$$SNR[est] = C \times \sqrt{A_{TOF}}$$

The value of the estimated SNR may be used to identify a value of range inaccuracy to a virtual object due to noise (e.g., a virtual inaccuracy). This value of range inaccuracy due to noise may also be referred to as a range precision value. The range inaccuracy due to noise or range precision value corresponds to a measure of uncertainty associated with a perceived location of an object located in an environment, such as a virtual or real/physical environment. Such an uncertainty may correspond to a number of units such as, for example, centimeters (cm) or any other units. In an instance when this uncertainty spans a measure of 10 cm, the location of the object in the virtual environment at a distance of 12 meters plus or minus 5 cm, for example. In some examples, a value to assign to this range inaccuracy due to noise or range precision may be calculated using Equation 3 (the range precision formula) below.

Range Precision Formula

Equation 3

$$\sigma[\text{cm}] = \frac{1}{\pi\sqrt{8}} \times \frac{R_g}{SNR} \times 100$$

Note that the range precision σ [cm] value formula is proportional to the inverse of the SNR and is proportional to a value of $R_g$ that is a measure of the unambiguous range of the system. Other forms of the range precision formula can be used depending on the type of modulation waveforms used in the in the light-based sensor or sensing apparatus. Such apparatus may also be referred to as a time of flight (TOF) sensing apparatus. As mentioned above, the term range precision may be used interchangeably with the term range inaccuracy.

Equation 4 illustrates another example equation that may be used to identify an estimated SNR from ATOF values. The noise multiplier and a value of DN may be constants selected by engineers that implement a simulation. In certain instances, a value of ATOF associated with a simulation may be used to calculate an estimated value of SNR.

ATOF to SNR

Equation 4

$$SNR = \frac{A_{TOF}}{\sqrt{A_{TOF}}\ \text{noise multiplier}\sqrt{96.6\left[\frac{e^-}{DN}\right]}}$$

At block 270, the process can include preparing and/or updating the set of simulation data that can be used when a simulation is run. This set of simulation data may have been generated from computer models that estimate data that could be provided by the sensor in a particular environment where an AV may drive and may include data that is associated with a virtual object. At block 280, the process can include identifying whether a simulation dataset is complete. A simulation dataset may be considered complete once objects included in the set of reference dataset have been evaluated at the simulation distance. If the simulation dataset is not complete, the process can return to block 220 where other simulation distances are associated with the object or another object may be identified such that the simulation dataset can be completed. If the simulation dataset is complete, the process can include storing the simulation dataset at block 290 such that the simulation dataset can be provided to a simulation—AV training process. For example, if the simulation dataset is complete, the process can use the simulation dataset to train an AV and/or run AV simulations. As mentioned above, an AV training process may use datasets of generated data to train operation of an apparatus designed to automatically drive an AV before that AV ever drives on a public roadway.

The set of simulation data may be used to limit an execution time that may be associated with full simulations of an environment. This is because calculations associated with a simulation can be computationally intense enough to take much more than an amount of time that can be allocated to perform the simulation. By preparing sets of simulation data in advance, the simulation can run much faster. Furthermore, by storing data at a lookup table, simulations can be performed within a threshold amount of time. In some examples, parsing the set of simulation data may allow the simulation to run from about 5 percent to about 10 percent of real time (or substantially real time). A such, a threshold amount of time that a simulation is allowed to run may correspond to a percentage of real time. This may allow a simulation to execute in real time (or substantially real time) when that simulation performs other tasks, such as making evaluations associated with other sensors of an AV driving apparatus. Such percentages or time allotments may be included in a timing budget for executing instructions of a computer simulation.

In some instances, information included in a lookup table may include one or more of a distance to an object, an amount of transmitted light, a frequency or modulation frequency of the transmitted light, an integration or exposure time, a reflectance of the object at the transmitted light frequency, an ambient amount of light power, a value of ATOF, and/or a value of SNR. The information stored in the lookup table may be collected when a physical sensor collected data in laboratory conditions (e.g., in a garage). By accessing data stored in a lookup table, a processor may be able to rapidly identify parameters to include in a set of simulation data more quickly. A value of SNR to include in a simulation dataset may be identified by accessing stored lookup table data. Thus, a value of the simulated SNR may be identified from a lookup table. A value of a range precision or range inaccuracy, σ [cm], may be quickly identified using Equation 3 when the simulation is run. Alternatively, a value of ATOF may be identified from the lookup table and values of an SNR and range precision/range inaccuracy may be calculated. This may include identifying a value of simulated ATOF to include in a set of simulation data from an ATOF value stored at the lookup table. For example, Equation 1 may be used to identify a value of a simulated ATOF from a reference ATOF value stored in the lookup table. Moreover, Equation 4 may be used to identify a value of the simulated SNR. While various factors could have contributed to an amount of noise measured in an actual sensor (e.g., a real, physical sensor), those factors may not have to be enumerated. Some factors that could affect noise measurements include yet are not limited to noise associated with received sunlight, noise generated internally to a TOF sensor, noise received from one or more external sources, and/or other noise sources.

The systems and techniques of the present disclosure allow for simulation datasets to be created such that operations associated with other functions of an AV driving system may be evaluated in a virtual environment. This may allow engineers assigned to the function of improving a set of software (e.g., a perception set of software or perception stack) that allows computers of the AV driving system to perceive actions that may occur in an environment. Any actions that result in a negative outcome in a simulation may allow engineers developing the software of the perception stack to update their software. This is also true when noise is a factor that can affect the performance of an AV driving system. By estimating noise and/or SNR from measured sensor data, the systems and techniques described herein can allow for AV driving systems to be developed more efficiently because the systems and techniques described herein can leverage the power of computer simulations and data acquired from real sensors. Furthermore, measuring noise associated with a real time operation of a sensor allows for noise that is characteristic of a particular sensor or sensing environment to be used without having to know where that noise came from. This also frees engineers from having to attempt to simulate types of noise that may or may not be representative of a real sensor. This real data may be modified by certain effects, such as a change in distance, to allow simulations to run much faster as compared to simulations that model theoretical noise. Models that simulate theoretical noise are slow because they are inherently computationally intensive. On the other hand, making modifications to real data using the systems and techniques disclosed herein is not as computationally intensive. Therefore, the systems and techniques described herein inherently improve the operation of a computer simulation.

Portions of data from the sets of simulation data may be added to a set of lookup tables that allow a processor(s) executing instructions of the simulation program to access data via the lookup tables. Here data associated with a particular frame, set of frames, or exposer may be limited to a number of lookups. For example, a processor executing a simulation may perform a set of 76,800 lookups when a simulation associated with a frame of data is performed. Such lookups will be much faster and less computationally intense as compared to performing a complete simulation.

Figure 3:
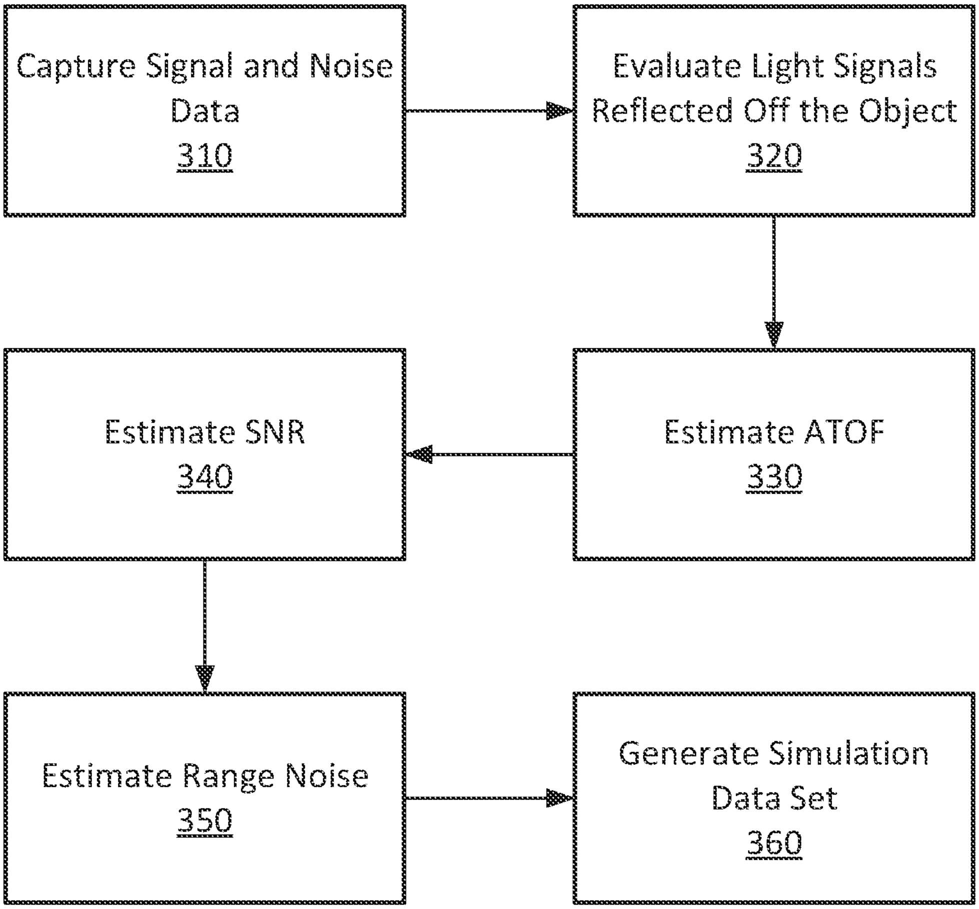
FIG. 3 illustrates a process for implementing simulations used to develop autonomous vehicle driving systems, according to some examples of the present disclosure.

FIG. 3 illustrates an example process for efficiently performing simulations used to develop autonomous vehicles driving systems. At block 310, the process can include collecting signal and noise data. The signal and noise data can be collected from a laboratory environment or a real-world/physical environment. Moreover, the signal and nose data may include some or all of the actions described above with respect to FIG. 1 (e.g., the identification of light signal amplitudes and noise levels). The data collected at block 310 may be captured by a specific type of light sensing apparatus that may be referred to as a "Daisy" sensor. In some examples, such a "Daisy" sensor may include a sensor that in some ways is similar to a light detecting and ranging (LIDAR) sensor yet may be a sensor of a proprietary design or may be a modified LIDAR sensor. At block 320, the process can include evaluating data associated with light signals reflected from an object such that values of ATOF or noise may be identified. For example, the process can identify a level of noise associated with the light signals being reflected from the object. Such evaluations may identify a light signal amplitude associated with a reflection from the object. Alternatively, or additionally, the evaluations made in block 320 may identify a signal to noise ratio. The data used to make the evaluations of block 320 may be made using actual data collected by a real physical sensor. In some examples, the data can be evaluated as part of a calibration process.

At block 330, the process can include identifying estimates of a light signal amplitude (an ATOF value) that could be included in a set of simulation data. This ATOF value may have been identified by applying Equation 1 using a value of simulation distance, integration time, and reflectance. At block 340, the process can include identifying an amount of signal to noise ratio (SNR) using Equation 2 that could be included in the set of simulation data. At block 350, the process can include identifying an estimate of a range noise (e.g., a range noise or uncertainty) value that could be included in the set of simulation data. The estimates made in one or more of blocks 340, 350, or 360 may be identified based on a distance associated with a location of a virtual object in a simulation. Such a virtual object may be a same object from which reflected light signals were received yet may be located at different locations relative to a TOF sensor in a simulation. This simulation distance may be different from a calibration distance and the virtual object may have different levels of reflected light signal or noise as compared to values of reflected light signals or noise that were identified in a real-world testing environment, such as a garage.

At block 360, the process can include generating a set of simulation data as discussed in respect to the actions performed in respect to FIG. 2 and may include data associated with a virtual object as discussed above. This may include preparing at least some of the simulation data to be stored in a lookup table. This set of simulation data may include one or more of the estimates of ATOF value identified in block 330, the SNR identified at block 340, and/or the range noise identified at block 350. In some examples, blocks 330 through 360 may include some or all of the blocks discussed above with respect to FIG. 2.

Figure 4:
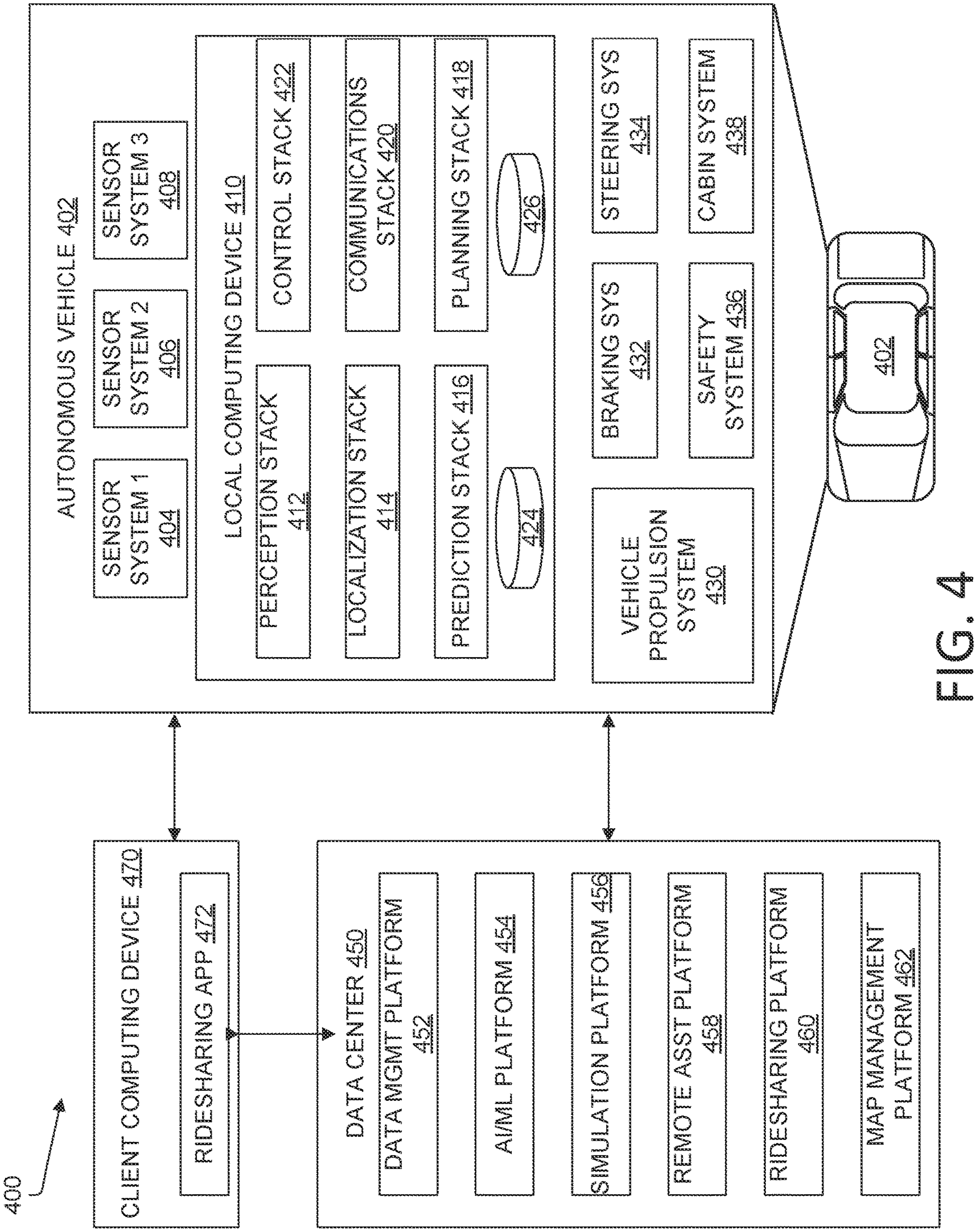
FIG. 4 illustrates a system environment that can be used to facilitate autonomous vehicle (AV) dispatch and operations, according to some examples of the present disclosure.

FIG. 4 is a diagram illustrating an example autonomous vehicle (AV) environment 400, according to some examples of the present disclosure. One of ordinary skill in the art will understand that, for the AV management environment 400 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV management environment 400 includes an AV 402, a data center 450, and a client computing device 470. The AV 402, the data center 450, and the client computing device 470 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 402 can navigate roadways without a human driver based on sensor signals generated by multiple sensor systems, such as sensor systems 404, 406, and 408. The sensor systems 404-408 can include one or more types of sensors and can be arranged about the AV 402. For instance, the sensor systems 404-408 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 404 can be a camera system, the sensor system 406 can be a LIDAR system, and the sensor system 408 can be a RADAR system. Other examples may include any other number and type of sensors.

The AV 402 can also include several mechanical systems that can be used to maneuver or operate the AV 402. For instance, the mechanical systems can include a vehicle propulsion system 430, a braking system 432, a steering system 434, a safety system 436, and a cabin system 438, among other systems. The vehicle propulsion system 430 can include an electric motor, an internal combustion engine, or both. The braking system 432 can include an engine brake, brake pads, actuators, and/or any other suitable componentry configured to assist in decelerating the AV 402. The steering system 434 can include suitable componentry configured to control the direction of movement of the AV 402 during navigation. The safety system 436 can include lights and signal indicators, a parking brake, airbags, and so forth. The cabin system 438 can include cabin temperature control systems, in-cabin entertainment systems, and so forth. In some examples, the AV 402 might not include human driver actuators (e.g., steering wheel, handbrake, foot brake pedal, foot accelerator pedal, turn signal lever, window wipers, etc.) for controlling the AV 402. Instead, the cabin system 438 can include one or more client interfaces (e.g., Graphical User Interfaces (GUIs), Voice User Interfaces (VUIs), etc.) for controlling certain aspects of the mechanical systems 430-438.

The AV 402 can include a local computing device 410 that is in communication with the sensor systems 404-408, the mechanical systems 430-438, the data center 450, and the client computing device 470, among other systems. The local computing device 410 can include one or more processors and memory, including instructions that can be executed by the one or more processors. The instructions can make up one or more software stacks or components responsible for controlling the AV 402; communicating with the data center 450, the client computing device 470, and other systems; receiving inputs from riders, passengers, and other entities within the AV's environment; logging metrics collected by the sensor systems 404-408; and so forth. In this example, the local computing device 410 includes a perception stack 412, a mapping and localization stack 414, a prediction stack 416, a planning stack 418, a communications stack 420, a control stack 422, an AV operational database 424, and an HD geospatial database 426, among other stacks and systems.

The perception stack 412 can enable the AV 402 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 404-408, the mapping and localization stack 414, the HD geospatial database 426, other components of the AV, and other data sources (e.g., the data center 450, the client computing device 470, third party data sources, etc.). The perception stack 412 can detect and classify objects and determine their current locations, speeds, directions, and the like. In addition, the perception stack 412 can determine the free space around the AV 402 (e.g., to maintain a safe distance from other objects, change lanes, park the AV, etc.). The perception stack 412 can identify environmental uncertainties, such as where to look for moving objects, flag areas that may be obscured or blocked from view, and so forth. In some examples, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 414 can determine the AV's position and orientation (pose) using different methods from multiple systems (e.g., GPS, IUs, cameras, LIDAR, RADAR, ultrasonic sensors, the HD geospatial database 426, etc.). For example, in some cases, the AV 402 can compare sensor data captured in real-time by the sensor systems 404-408 to data in the HD geospatial database 426 to determine its precise (e.g., accurate to the order of a few centimeters or less) position and orientation. The AV 402 can focus its search based on sensor data from one or more first sensor systems (e.g., GPS) by matching sensor data from one or more second sensor systems (e.g., LIDAR). If the mapping and localization information from one system is unavailable, the AV 402 can use mapping and localization information from a redundant system and/or from remote data sources.

The prediction stack 416 can receive information from the localization stack 414 and objects identified by the perception stack 412 and predict a future path for the objects. In some examples, the prediction stack 416 can output several likely paths that an object is predicted to take along with a probability associated with each path. For each predicted path, the prediction stack 416 can also output a range of points along the path corresponding to a predicted location of the object along the path at future time intervals along with an expected error value for each of the points that indicates a probabilistic deviation from that point.

The planning stack 418 can determine how to maneuver or operate the AV 402 safely and efficiently in its environment. For example, the planning stack 418 can receive the location, speed, and direction of the AV 402, geospatial data, data regarding objects sharing the road with the AV 402 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 402 from one point to another and outputs from the perception stack 412, localization stack 414, and prediction stack 416. The planning stack 418 can determine multiple sets of one or more mechanical operations that the AV 402 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 418 can select from multiple backup plans to carry out. For example, while preparing to change lanes to turn right at an intersection, another vehicle may aggressively cut into the destination lane, making the lane change unsafe. The planning stack 418 could have already determined an alternative plan for such an event. Upon its occurrence, it could help direct the AV 402 to go around the block instead of blocking a current lane while waiting for an opening to change lanes.

The control stack 422 can manage the operation of the vehicle propulsion system 430, the braking system 432, the steering system 434, the safety system 436, and the cabin system 438. The control stack 422 can receive sensor signals from the sensor systems 404-408 as well as communicate with other stacks or components of the local computing device 410 or a remote system (e.g., the data center 450) to effectuate operation of the AV 402. For example, the control stack 422 can implement the final path or actions from the multiple paths or actions provided by the planning stack 418. This can involve turning the routes and decisions from the planning stack 418 into commands for the actuators that control the AV's steering, throttle, brake, and drive unit.

The communications stack 420 can transmit and receive signals between the various stacks and other components of the AV 402 and between the AV 402, the data center 450, the client computing device 470, and other remote systems. The communications stack 420 can enable the local computing device 410 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 420 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 426 can store HD maps and related data of the streets upon which the AV 402 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal U-turn lanes; permissive or protected only right turn lanes; etc.). The traffic controls lane can include geospatial information of traffic signal lights, traffic signs, and other road objects and related attributes.

The AV operational database 424 can store raw AV data generated by the sensor systems 404-408, stacks 412-422, and other components of the AV 402 and/or data received by the AV 402 from remote systems (e.g., the data center 450, the client computing device 470, etc.). In some examples, the raw AV data can include HD LIDAR point cloud data, image data, RADAR data, GPS data, and other sensor data that the data center 450 can use for creating or updating AV geospatial data or for creating simulations of situations encountered by AV 402 for future testing or training of various machine learning algorithms that are incorporated in the local computing device 410.

The data center 450 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 450 can include one or more computing devices remote to the local computing device 410 for managing a fleet of AVs and AV-related services. For example, in addition to managing the AV 402, the data center 450 may also support a ridesharing service, a delivery service, a remote/roadside assistance service, street services (e.g., street mapping, street patrol, street cleaning, street metering, parking reservation, etc.), and the like.

The data center 450 can send and receive various signals to and from the AV 402 and the client computing device 470. These signals can include sensor data captured by the sensor systems 404-408, roadside assistance requests, software updates, ridesharing pick-up and drop-off instructions, and so forth. In this example, the data center 450 includes a data management platform 452, an Artificial Intelligence/Machine Learning (AI/ML) platform 454, a simulation platform 456, a remote assistance platform 458, and a ridesharing platform 460, and a map management platform 462, among other systems.

The data management platform 452 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 450 can access data stored by the data management platform 452 to provide their respective services.

The AI/ML platform 454 can provide the infrastructure for training and evaluating machine learning algorithms for operating the AV 402, the simulation platform 456, the remote assistance platform 458, the ridesharing platform 460, the map management platform 462, and other platforms and systems. Using the AI/ML platform 454, data scientists can prepare data sets from the data management platform 452; select, design, and train machine learning models; evaluate, refine, and deploy the models; maintain, monitor, and retrain the models; and so on.

The simulation platform 456 can enable testing and validation of the algorithms, machine learning models, neural networks, and other development efforts for the AV 402, the remote assistance platform 458, the ridesharing platform 460, the map management platform 462, and other platforms and systems. The simulation platform 456 can replicate a variety of driving environments and/or reproduce real-world scenarios from data captured by the AV 402, including rendering geospatial information and road infrastructure (e.g., streets, lanes, crosswalks, traffic lights, stop signs, etc.) obtained from a cartography platform (e.g., map management platform 462); modeling the behavior of other vehicles, bicycles, pedestrians, and other dynamic elements; simulating inclement weather conditions, different traffic scenarios; and so on.

The remote assistance platform 458 can generate and transmit instructions regarding the operation of the AV 402. For example, in response to an output of the AI/ML platform 454 or other system of the data center 450, the remote assistance platform 458 can prepare instructions for one or more stacks or other components of the AV 402.

The ridesharing platform 460 can interact with a customer of a ridesharing service via a ridesharing application 472 executing on the client computing device 470. The client computing device 470 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ridesharing application 472. The client computing device 470 can be a customer's mobile computing device or a computing device integrated with the AV 402 (e.g., the local computing device 410). The ridesharing platform 460 can receive requests to pick up or drop off from the ridesharing application 472 and dispatch the AV 402 for the trip.

Map management platform 462 can provide a set of tools for the manipulation and management of geographic and spatial (geospatial) and related attribute data. The data management platform 452 can receive LIDAR point cloud data, image data (e.g., still image, video, etc.), RADAR data, GPS data, and other sensor data (e.g., raw data) from one or more AVs 402, Unmanned Aerial Vehicles (UAVs), satellites, third-party mapping services, and other sources of geospatially referenced data. The raw data can be processed, and map management platform 462 can render base representations (e.g., tiles (2D), bounding volumes (3D), etc.) of the AV geospatial data to enable users to view, query, label, edit, and otherwise interact with the data. Map management platform 462 can manage workflows and tasks for operating on the AV geospatial data. Map management platform 462 can control access to the AV geospatial data, including granting or limiting access to the AV geospatial data based on user-based, role-based, group-based, task-based, and other attribute-based access control mechanisms. Map management platform 462 can provide version control for the AV geospatial data, such as to track specific changes that (human or machine) map editors have made to the data and to revert changes when necessary. Map management platform 462 can administer release management of the AV geospatial data, including distributing suitable iterations of the data to different users, computing devices, AVs, and other consumers of HD maps. Map management platform 462 can provide analytics regarding the AV geospatial data and related data, such as to generate insights relating to the throughput and quality of mapping tasks.

In some examples, the map viewing services of map management platform 462 can be modularized and deployed as part of one or more of the platforms and systems of the data center 450. For example, the AI/ML platform 454 may incorporate the map viewing services for visualizing the effectiveness of various object detection or object classification models, the simulation platform 456 may incorporate the map viewing services for recreating and visualizing certain driving scenarios, the remote assistance platform 458 may incorporate the map viewing services for replaying traffic incidents to facilitate and coordinate aid, the ridesharing platform 460 may incorporate the map viewing services into the client application 472 to enable passengers to view the AV 402 en route (e.g., in transit) to a pick-up or drop-off location, and so on.

Figure 5:
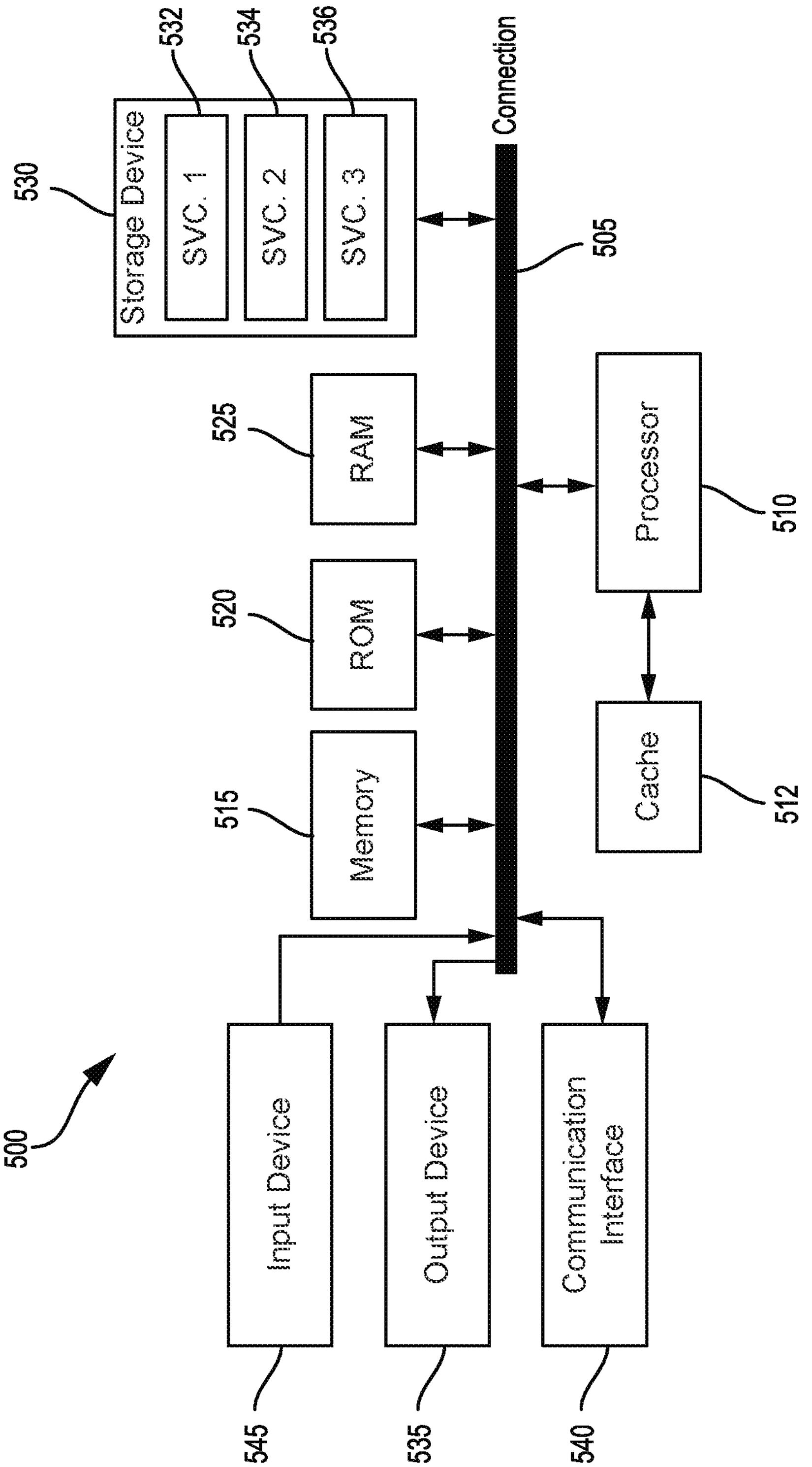
FIG. 5 illustrates an example processor-based system with which some aspects of the subject technology can be implemented.

FIG. 5 illustrates an example processor-based system with which some aspects of the subject technology can be implemented. For example, processor-based system 500 can be any computing device making up, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some examples, computing system 500 is a distributed system in which the functions described in this disclosure can be distributed within a datacenter, multiple data centers, a peer network, etc. In some examples, one or more of the described system components represents many such components each performing some or all of the function for which the component is described. In some instances, the components can be physical or virtual devices.

Example system 500 includes at least one processing unit (Central Processing Unit (CPU) or processor) 510 and connection 505 that couples various system components including system memory 515, such as Read-Only Memory (ROM) 520 and Random-Access Memory (RAM) 525 to processor 510. Computing system 500 can include a cache of high-speed memory 512 connected directly with, in close proximity to, or integrated as part of processor 510.

Processor 510 can include any general-purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. The communication interface may perform or facilitate receipt and/or transmission wired or wireless communications via wired and/or wireless transceivers, including those making use of an audio jack/ plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 540 may also include one or more Global Navigation Satellite System (GNSS) receivers or transceivers that are used to determine a location of the computing system 500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Static RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 530 can include software services, servers, services, etc., that when the code that defines such software is executed by the processor 510, it causes the system 500 to perform a function. In some instances, a hardware service that performs a particular function can include the software component stored in a computer-readable medium in connection with the necessary hardware components, such as processor 510, connection 505, output device 535, etc., to carry out the function.

Aspects and examples within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in standalone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Aspects and examples of the disclosure may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative aspects of the disclosure include:

Aspect 1. A method comprising: obtaining data from a time-of-flight (TOF) sensor that received a reflected portion of a light signal from an object, wherein the TOF sensor data comprises a plurality of metrics, the plurality of metrics comprising a measure of noise and an amplitude of the reflected portion of the light signal. This method may also include determining, based on the TOF sensor data, a signal to noise ratio (SNR) from the amplitude of the reflected portion of the light signal and the measure of noise; identifying a value of a simulated SNR to include in a set of simulation data based on an association between the data from the TOF sensor, the determined SNR, and the object; and generating the set of simulation data that includes the value of the simulated SNR.

Aspect 2. The method of Aspect 1, wherein the plurality of metrics includes a calibration distance and a calibrated reflectance, and the set of simulation data for the virtual object comprises one or more of a distance to a virtual object, an estimated light signal amplitude associated with the virtual object, or the simulated SNR value for the virtual object.

Aspect 3. The method of Aspects 1 to 2, further comprising simulating operation of an AV in a simulated environment including a virtual object; and providing the set of simulation data for the virtual object to a perception layer of the AV. Aspect 4. The method of Aspects 1 to 3, further comprising identifying a range inaccuracy associated with the determined SNR, wherein the range inaccuracy is a function of the measure of noise, the amplitude of the reflected portion of the light signal, and the calibration distance; identifying a virtual inaccuracy to associate the virtual object, wherein the virtual inaccuracy is a function of a noise associated with an estimated light signal, an amplitude of the estimated light signal, and a distance to the virtual object; and including the virtual inaccuracy in the set of simulation data.

Aspect 5. The method of Aspects 1 to 4, further comprising identifying an amplitude time-of-flight (ATOF) value based on the reflected portion of light signal received from the object; identifying a simulated ATOF value to associate with a virtual object, and included in the set of simulation data; performing a calculation to identify a virtual SNR to associate with the virtual object and to include in the set of simulation data; and simulating operation of an autonomous vehicle (AV) in a simulated environment including the virtual ATOF value and the virtual SNR included in the set of simulation data.

Aspect 6. The method of Aspects 1 to 5, further comprising training a computer model based on the set of simulation data, wherein the computer model simulates operation of an autonomous driving computer system (ADCS) associated with an autonomous vehicle (AV).

Aspect 7. The method of any of Aspects of claims 1 to 6, further comprising identifying a timing budget for executing instructions of a computer simulation of a virtual object located in a virtual environment; and organizing the set of simulation data such that a processor executing the instructions of the computer simulation performs the computer simulation within the timing budget.

Aspect 8. The method of any of Aspects 1 to 7, wherein the data is obtained from the TOF sensor by a computer system of an autonomous vehicle.

Aspect 9. The method of any of Aspects 1 to 8, wherein the SNR and range inaccuracy and the set of simulation data are determined by a computer system of an autonomous vehicle.

Aspect 10. The method of any of Aspects 1 to 9, wherein at least one of the set of simulation data, the SNR, and the range inaccuracy are determined by a neural network model implemented by a computer system of an autonomous vehicle.

Aspect 11. The method of any of Aspects 1 to 10, further comprising: sending, by the TOF sensor to one or more targets, one or more light signals, the one or more light signals comprising the light signal; receiving the reflected portion of the light signal; and determining, based on at least one of the light signal and the reflected portion of the light signal, at least one of the calibration distance, the calibrated reflectance, the measure of noise, and/or the amplitude of the reflected portion of the light signal.

Aspect 12. The method of any of Aspects 1 to 11, wherein the range inaccuracy comprises or represents a measure of uncertainty of a perceived location of an object in an environment, the perceived location comprising or representing a location perceived by a computer system of an autonomous vehicle.

Aspect 13. A non-transitory computer-readable storage media having stored thereon instructions which, when executed by one or more processors, cause the one or more processors to perform a method according to any of Aspects 1 to 12.

Aspect 14. A system comprising means for performing a method according to any of Aspects 1 to 12.

Aspect 15. The system of Aspect 14, wherein the system comprises one or more computer devices of an autonomous vehicle.

Aspect 16. A computer program product comprising instructions which, when executed by one or more processors, cause the one or more processors to perform a method according to any of Aspects 1 to 12.

Aspect 17. An autonomous vehicle (AV) comprising a computer system that includes memory and one or more processors coupled to the memory, the one or more processors being configured to perform a method according to any of Aspects 1 to 12.

Aspect 18. An apparatus comprising: memory and one or more processors coupled to the memory, wherein the one or more processors are configured to perform a method according to any of Aspects 1 to 12.

Aspect 19. The apparatus of Aspect 18, wherein the one or more processors are configured to receive the data from the TOF sensor and determine the plurality of metrics based on the data.

Aspect 20. The apparatus of Aspect 18 or 19, wherein the apparatus comprises a computer system of an autonomous vehicle.

What is claimed is:

1. A computer-implemented method comprising:

obtaining data from a time-of-flight (TOF) sensor that received a reflected portion of a light signal from an object, wherein the data from the TOF sensor comprises a plurality of metrics, the plurality of metrics comprising a measure of noise and an amplitude of the reflected portion of the light signal and includes a calibration distance and a calibrated reflectance;

determining, based on the data from the TOF sensor, a signal to noise ratio (SNR) from the amplitude of the reflected portion of the light signal and the measure of noise;

identifying a value of a simulated SNR to include in a set of simulation data based on an association between the data from the TOF sensor, the determined SNR, and the object; and generating the set of simulation data that includes the value of the simulated SNR and a virtual object comprising one or more of a distance to the virtual object, an estimated light signal amplitude associated with the virtual object, or the value of the simulated SNR for the virtual object.

2. The computer-implemented method of claim 1, further comprising:

simulating operation of an AV in a simulated environment including a virtual object; and providing the set of simulation data for the virtual object to a perception layer of the AV.

3. The computer-implemented method of claim 1, further comprising:

identifying a range inaccuracy associated with the determined SNR, wherein the range inaccuracy is a function of the measure of noise, the amplitude of the reflected portion of the light signal, and a calibration distance;

identifying a virtual inaccuracy to associate a virtual object, wherein the virtual inaccuracy is a function of a noise associated with an estimated light signal, an amplitude of the estimated light signal, and a distance to the virtual object; and including the virtual inaccuracy in the set of simulation data.

4. The computer implemented method of claim 1, further comprising:

identifying an amplitude time-of-flight (ATOF) value based on the reflected portion of light signal received from the object;

identifying a simulated ATOF value to associate with a virtual object, and included in the set of simulation data;

performing a calculation to identify a virtual SNR to associate with the virtual object and to include in the set of simulation data; and simulating operation of an autonomous vehicle (AV) in a simulated environment including the virtual ATOF value and the virtual SNR included in the set of simulation data.

5. The computer-implemented method of claim 1, further comprising training a computer model based on the set of simulation data, wherein the computer model simulates operation of an autonomous driving computer system (ADCS) associated with an autonomous vehicle (AV).

6. The computer-implemented method of claim 1, further comprising:

identifying a timing budget for executing instructions of a computer simulation of a virtual object located in a virtual environment; and organizing the set of simulation data such that a processor executing the instructions of the computer simulation performs the computer simulation within the timing budget.

7. A non-transitory computer-readable storage media having stored thereon instructions which, when executed by one or more processors, cause the one or more processors to:

obtain data from a time-of-flight (TOF) sensor that received a reflected portion of a light signal from an object, wherein the data from the TOF sensor data comprises a plurality of metrics, the plurality of metrics comprising a measure of noise and an amplitude of the reflected portion of the light signal;

determine, based on the data from the TOF sensor, a signal to noise ratio (SNR) from the amplitude of the reflected portion of the light signal and the measure of noise;

identify a range inaccuracy associated with the determined SNR, wherein the range inaccuracy is a function of the measure of noise, the amplitude of the reflected portion of the light signal, and a calibration distance;

identify a value of a simulated SNR to include in a set of simulation data based on an association between the data from the TOF sensor, the determined SNR, and the object;

identify a virtual inaccuracy to associate a virtual object, wherein the virtual inaccuracy is a function of a noise associated with an estimated light signal, an amplitude of the estimated light signal, and a distance to the virtual object; and generate the set of simulation data that includes the value of the simulated SNR and the virtual inaccuracy in the set of simulation data.

8. The non-transitory computer-readable storage media of claim 7, wherein the plurality of metrics includes a calibration distance and a calibrated reflectance, and the set of simulation data for a virtual object comprises one or more of a distance to the virtual object, an estimated light signal amplitude associated with the virtual object, or the value of the simulated SNR for the virtual object.

9. The non-transitory computer-readable storage media of claim 7, the one or more processors execute the instructions to:

simulate operation of an AV in a simulated environment including a virtual object; and provide the set of simulation data for the virtual object to a perception layer of the AV.

10. The non-transitory computer-readable storage media of claim 7, the one or more processors execute the instructions to:

identify an amplitude time-of-flight (ATOF) value based on the reflected portion of light signal received from the object;

identify a simulated ATOF value to associate with a virtual object, and included in the set of simulation data;

perform a calculation to identify a virtual SNR to associate with the virtual object and to include in the set of simulation data; and simulate operation of an autonomous vehicle (AV) in a simulated environment including the virtual ATOF value and the virtual SNR included in the set of simulation data.

11. The non-transitory computer-readable storage media of claim 7, the one or more processors execute the instructions to:

train a computer model based on the set of simulation data, wherein the computer model simulates operation of an autonomous driving computer system (ADCS) associated with an autonomous vehicle (AV).

12. The non-transitory computer-readable storage media of claim 7, the one or more processors execute the instructions to:

identify a timing budget for executing instructions of a computer simulation of a virtual object located in a virtual environment; and organize the set of simulation data such that a processor executing the instructions of the computer simulation performs the computer simulation within the timing budget.

13. The non-transitory computer-readable storage media of claim 7, wherein the instructions, when executed by the one or more processors, cause the one or more processors to:

identify at least one of a luminosity of a scene associated with a virtual object, a reflectance of the virtual object, an azimuth associated with the virtual object, and an elevation associated with the virtual object, wherein the set of simulation data includes the at least one of the luminosity, the reflectance, the azimuth, and the elevation.

14. The non-transitory computer-readable storage media of claim 7, wherein the instructions, when executed by the one or more processors, cause the one or more processors to:

identify a timing budget for executing instructions of a computer simulation of a virtual object located in a virtual environment; and organize the set of simulation data such that a processor executing the instructions of the computer simulation performs the computer simulation within the timing budget.

15. An apparatus comprising:

a memory; and one or more processors coupled to the memory, wherein the one or more processors are configured to:

obtain data from a time-of-flight (TOF) sensor that received a reflected portion of a light signal from an object, wherein the from the TOF sensor comprises a plurality of metrics, the plurality of metrics comprising a measure of noise and an amplitude of the reflected portion of the light signal, determine, based on the data from the TOF sensor, a signal to noise ratio (SNR) from the amplitude of the reflected portion of the light signal and the measure of noise, identify a value of a simulated SNR to include in a set of simulation data based on an association between the data from the TOF sensor, the determined SNR, and the object;

identify an amplitude time-of-flight (ATOF) value based on the reflected portion of light signal received from the object;

identify a simulated ATOF value to associate with a virtual object;

perform a calculation to identify a virtual SNR to associate with the virtual object; and generate the set of simulation data that includes the value of the simulated SNR, the simulated ATOF value, and the virtual SNR associated with the virtual object.

16. The apparatus of claim 15, wherein accessing the data further comprises, wherein the one or more processors execute instructions to:

identify a range inaccuracy associated with the determined SNR, wherein the range inaccuracy is a function of the measure of noise, the amplitude of the reflected portion of the light signal, and a calibration distance, identify a virtual inaccuracy to associate a virtual object, wherein the virtual inaccuracy is a function of a noise associated with an estimated light signal, an amplitude of the estimated light signal, and a distance to the virtual object, and include the virtual inaccuracy in the set of simulation data.

17. The apparatus of claim 15, wherein instructions, when executed by the one or more processors, cause the one or more processors to:

simulate operation of an autonomous vehicle (AV) in a simulated environment including the virtual ATOF value and the virtual SNR included in the set of simulation data.

18. The apparatus of claim 15, wherein instructions, when executed by the one or more processors train a computer model based on the set of simulation data, wherein the computer model simulates operation of an autonomous driving computer system (ADCS) associated with an autonomous vehicle (AV).

* * * * *